(12) United States Patent
Reilly et al.

(10) Patent No.: US 9,214,153 B2
(45) Date of Patent: Dec. 15, 2015

(54) AURAL SMOOTHING OF A VEHICLE

(75) Inventors: Scott M. Reilly, Davisburg, MI (US); Timothy R. Bohn, Dexter, MI (US); Andrew W. Baur, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 12/893,310

(22) Filed: Sep. 29, 2010

(65) Prior Publication Data
US 2012/0076314 A1 Mar. 29, 2012

(51) Int. Cl.
*G06F 7/00* (2006.01)
*G10K 15/02* (2006.01)

(52) U.S. Cl.
CPC ........ G10K 15/02 (2013.01); *B60W 2510/0657* (2013.01)

(58) Field of Classification Search
CPC ..................... G10K 2210/1282; G10K 11/178
USPC ......................................... 701/36; 381/56–57
See application file for complete search history.

(56) References Cited

U.S. PATENT DOCUMENTS

| | | | | |
|---|---|---|---|---|
| 5,170,433 A * | 12/1992 | Elliott et al. | ................. | 704/226 |
| 5,245,664 A * | 9/1993 | Kinoshite et al. | ............ | 381/71.4 |
| 5,359,662 A * | 10/1994 | Yuan et al. | ................. | 381/71.14 |
| 5,426,705 A * | 6/1995 | Yokota et al. | ................ | 381/71.4 |
| 5,485,523 A * | 1/1996 | Tamamura et al. | .......... | 381/71.4 |
| 5,488,667 A | 1/1996 | Tamamura et al. | | |
| 5,493,616 A * | 2/1996 | Iidaka et al. | ................. | 381/71.4 |
| 5,581,619 A * | 12/1996 | Shibata et al. | ............... | 381/71.4 |
| 5,635,903 A * | 6/1997 | Koike et al. | .................... | 340/441 |
| 5,692,052 A * | 11/1997 | Tanaka et al. | ................ | 381/71.9 |
| 7,058,487 B2 * | 6/2006 | Hara et al. | ...................... | 701/22 |
| 7,088,829 B1 * | 8/2006 | Schick et al. | ................ | 381/71.4 |
| 7,203,321 B1 * | 4/2007 | Freymann et al. | ............. | 381/61 |
| 7,620,188 B2 * | 11/2009 | Inoue et al. | ................... | 381/71.4 |
| 7,775,320 B2 * | 8/2010 | McCain et al. | ............... | 181/206 |
| 7,876,910 B2 * | 1/2011 | Sakamoto et al. | .......... | 381/71.4 |
| 7,891,332 B2 * | 2/2011 | Shin et al. | .................. | 123/192.1 |
| 7,899,607 B2 * | 3/2011 | Shin et al. | ..................... | 701/111 |
| 8,027,484 B2 * | 9/2011 | Yoshida et al. | .............. | 381/71.4 |
| 8,045,723 B2 * | 10/2011 | Kobayashi et al. | ............ | 381/61 |
| 8,111,834 B2 * | 2/2012 | Kobayashi et al. | ......... | 381/71.4 |
| 2004/0086135 A1 * | 5/2004 | Vaishya | ........................ | 381/71.4 |
| 2007/0160227 A1 * | 7/2007 | Kogure et al. | ................. | 381/86 |
| 2008/0192948 A1 * | 8/2008 | Kan et al. | ..................... | 381/71.4 |
| 2009/0028353 A1 | 1/2009 | Kobayashi et al. | | |

(Continued)

FOREIGN PATENT DOCUMENTS

EP 2072769 A1 6/2009

OTHER PUBLICATIONS

German Office Action dated Mar. 15, 2012 for German Application 10 2011 114 111.5 corresponding to U.S. Appl. No. 12/893,310.

(Continued)

*Primary Examiner* — Dalena Tran
*Assistant Examiner* — Harry Oh
(74) *Attorney, Agent, or Firm* — Cantor Colburn LLP (57) ABSTRACT

A method of controlling sounds associated with a vehicle is provided. The method includes: performing on a processor, monitoring engine torque; and selectively controlling the generation of one or more tones associated with the vehicle based on the engine torque.

13 Claims, 5 Drawing Sheets

(56) References Cited

U.S. PATENT DOCUMENTS

| | | | |
|---|---|---|---|
| 2010/0014685 A1* | 1/2010 | Wurm | 381/71.11 |
| 2010/0195844 A1* | 8/2010 | Christoph et al. | 381/71.11 |
| 2010/0266135 A1* | 10/2010 | Theobald et al. | 381/71.4 |
| 2011/0280410 A1* | 11/2011 | Matono et al. | 381/71.1 |
| 2012/0070012 A1* | 3/2012 | Yoshizawa et al. | 381/71.4 |

OTHER PUBLICATIONS

Chinese Office Action for Application No. 201110340867.8 dated Dec. 2, 2013; 14 pages.

* cited by examiner

AURAL SMOOTHING OF A VEHICLE

FIELD OF THE INVENTION

Exemplary embodiments of the present invention are related to systems and methods for performing aural smoothing in a vehicle.

BACKGROUND

Vehicle control systems monitor vehicle power demands and selectively control one or more powertrain components such that an improved fuel economy can be provided. For example, during low power consumption activity, the vehicle control systems can transition the powertrain from operating an engine to operating a motor. Likewise, during high power consumption activity, the vehicle control system can transition the powertrain from operating the motor to operating the engine. Such transitions can cause abrupt changes in the sounds emitted from the vehicle. Unexpected abrupt changes in sound can be undesirable to a vehicle operator. Accordingly, it is desirable to provide systems and methods for improving the overall soundscape of a vehicle.

SUMMARY

In one exemplary embodiment, a method of controlling sounds associated with a vehicle is provided. The method includes: performing on a processor, monitoring engine torque; and selectively controlling the generation of one or more tones associated with the vehicle based on the engine torque.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
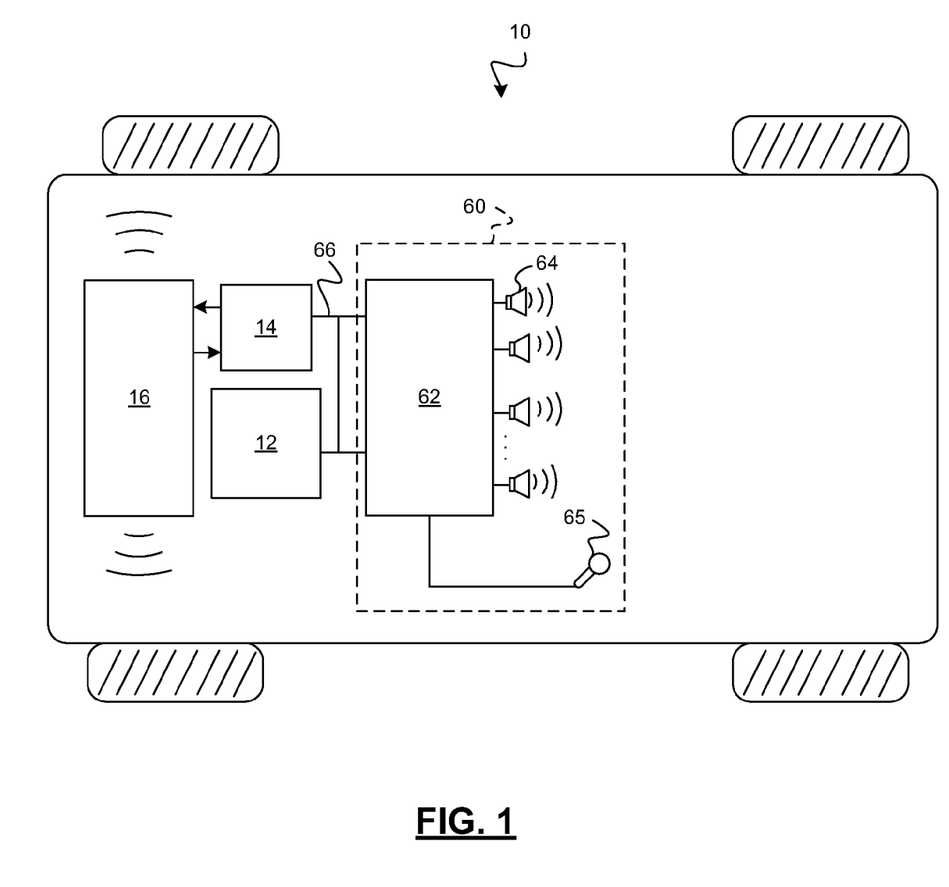
FIG. 1 is an illustration of a vehicle including an aural smoothing system in accordance with an exemplary embodiment.

In accordance with an exemplary embodiment of the present invention a vehicle is shown generally at 10. The vehicle includes an aural smoothing system 12. The aural smoothing system 12 communicates with one or more control modules 14. The one or more control modules 14 (hereinafter referred to as control module) control a powertrain 16 of the vehicle 10. The powertrain 16 includes one or more sources of propulsion for the vehicle 10.

Figure 2:
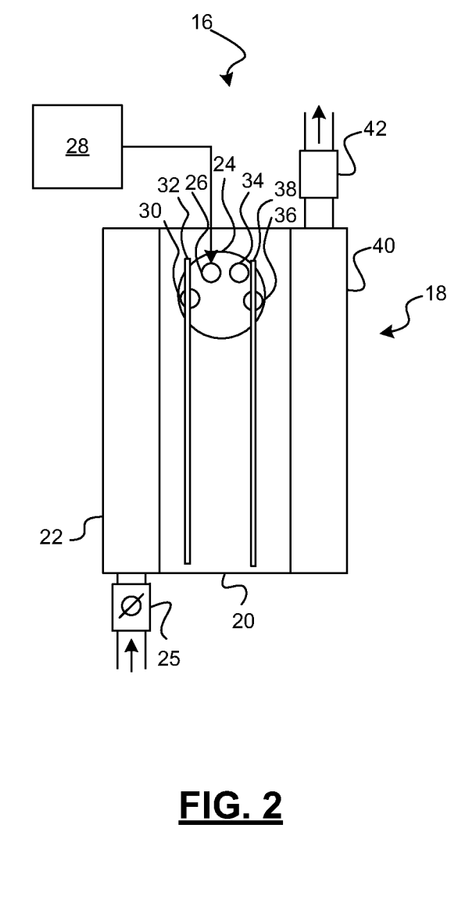
FIGS. 2 through 4 are illustrations of various powertrain configurations of the vehicle in accordance with an exemplary embodiment.

In various embodiments, as shown in FIG. 2, the powertrain 16 includes an engine system 18. The engine system 18 includes an internal combustion engine 20 that combusts an air and fuel mixture to produce drive torque. As can be appreciated, the aural smoothing system 12 is applicable to various internal combustion engines 20 such as, for example, gasoline engines, diesel engines, four stroke engines, or two stroke engines, or other engines and is not limited to the present example.

In the example engine system 18, air is drawn into an intake manifold 22 through, for example, a throttle 25. The throttle 25 regulates mass airflow into the intake manifold 22. Air within the intake manifold 22 is distributed into cylinders 24. Although a single cylinder 24 is illustrated, it can be appreciated that the aural smoothing system of the present disclosure can be implemented in engines 20 having a plurality of cylinders 24 including, but not limited to, 2, 3, 4, 5, 6, 8, 10, 12 and 16 cylinders arranged in a V-type flat, or inline configuration.

A fuel injector 26 injects fuel that is combined with the air as it is drawn into the cylinder 24 through an intake port. The fuel injector 26 may be an injector associated with an electronic or mechanical fuel injection system 28, a jet or port of a carburetor or another system for mixing fuel with intake air. The fuel injector 26 is controlled to provide a desired air-to-fuel (A/F) ratio within each cylinder 24.

An intake valve 30 selectively opens and closes to enable the air/fuel mixture to enter the cylinder 24. The intake valve position is regulated by an intake camshaft 32. A piston (not shown) compresses the air/fuel mixture within the cylinder 24. A spark plug 34 initiates combustion of the air/fuel mixture, which drives the piston in the cylinder 24. The piston, in turn, drives a crankshaft (not shown) to produce drive torque. Combustion exhaust within the cylinder 24 is forced out of an exhaust port when an exhaust valve 36 is in an open position. The exhaust valve position is regulated by an exhaust camshaft 38. The exhaust exits the engine 20 through an exhaust manifold 40, is treated in an exhaust system 42, and is released to the atmosphere.

In various embodiments, the engine 20 is controlled to selectively activate and deactivate the operation of one or more cylinders 24 to accommodate the changes in power demands of the vehicle 10. For example, an eight cylinder engine can be controlled to transition from operating with four cylinders firing to operating with eight cylinders firing due to an increase in a power demand. Such transition can be referred to as an activation transition. In another example, the eight cylinder engine can be controlled to transition from operating with eight cylinders firing to operating with four cylinders firing due to a decrease in a power demand. Such transition can be referred to as a deactivation transition.

Figure 3:
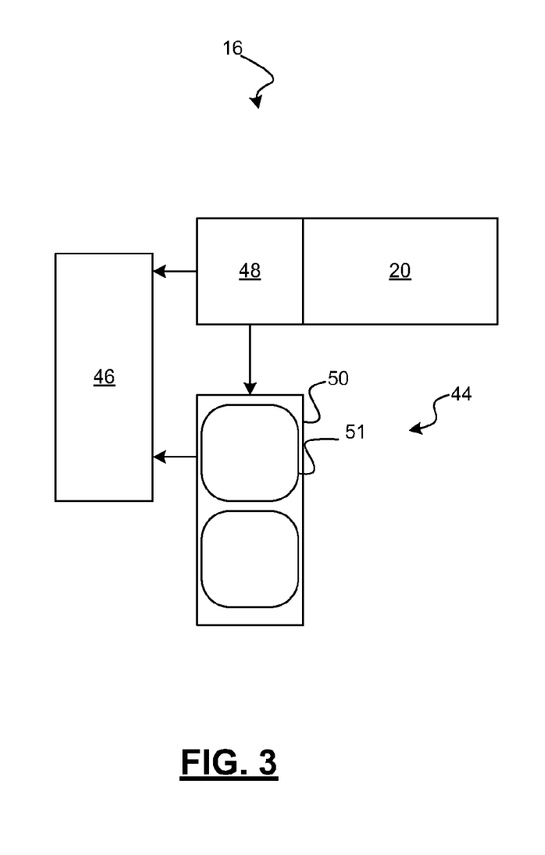

In various other embodiments, as shown in FIG. 3, the powertrain 16 includes a hybrid system 44 that includes an engine 20 and an electric drive motor 46. The hybrid system 44 can be arranged in a series configuration (as shown), in a parallel configuration, or in a series-parallel configuration. When in the series configuration, the engine 20 drives a generator 48 to generate electricity. The electricity is stored in an energy storage system 50 (e.g., a plurality of batteries 51) or is sent to the electric drive motor 46. The electric drive motor 46 functions as the primary source of propulsion of the vehicle 10 by driving the wheels. The electric drive motor 46 operates based on energy from the energy storage system 50 and/or from the engine 20. The engine 20 is an internal combustion engine, for example, as discussed with regard to FIG. 2.

When in the parallel configuration (not shown), the engine 20 and the electric drive motor 46 each function as a source of propulsion of the vehicle 10. The engine 20 and the electric drive motor 46 can operate together to propel the vehicle 10 and/or individually based on torque demands.

Figure 4:
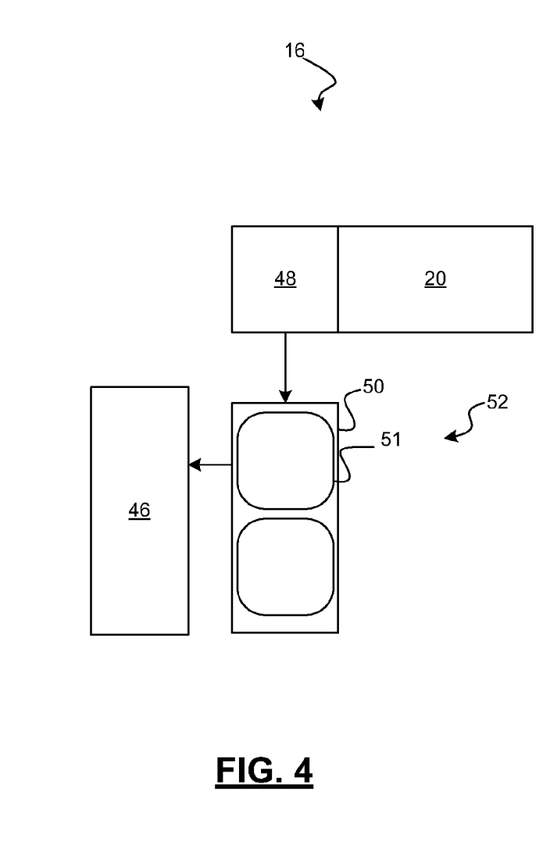

In various other embodiments, as shown in FIG. 4, the powertrain is a pure electric system 52 that includes the electric drive motor 46. The electric drive motor 46 operates on energy from the energy storage system 50. The energy storage system 50 can be charged via an exterior power source (i.e., by plugging into a home outlet). In such an arrangement, an engine 20 can be provided as an alternative charging source to charge the energy storage system 50 when the state of charge is low, thus, providing an extended range of use.

With reference back to FIG. 1, the aural smoothing system 12 further communicates with an infotainment system 60. Amongst other functions typical to vehicle infotainment systems, the infotainment system 60 includes an infotainment module 62 that manages the generation of various sounds within the vehicle 10 and/or outside of the vehicle 10 through one or more speakers 64. The speakers 64 can be located within the vehicle interior, under the vehicle hood, and/or on an exterior of the vehicle 10.

As can be appreciated, the aural smoothing system 12 can be integrated within the control module 14, can be integrated within the infotainment module 62, can be partially integrated within the control module 14 and partially integrated within the infotainment module 62, or can be separate from the control module 14 and the infotainment module 62 and can communicate with each via a vehicle communication network 66. For exemplary purposes, the disclosure will be discussed in the context of the aural smoothing system 12 being separate from and in communication with the infotainment module 62 and the control module 14.

In various embodiments, the aural smoothing system 12 monitors data that is generated by the control module 14 and that is communicated on the communication network 66. Based on the data, the aural smoothing system 12 identifies powertrain transition events and performs one or more sound management methods. The sound management methods communicate with the infotainment system 60 to perform aural smoothing of sounds generated by the vehicle 10. In various embodiments, the sound management methods can include one or more active noise cancellation methods and/or one or more sound blending methods. In various embodiments, the active noise cancellation methods remove objectionable sounds generated by the powertrain 16. In various embodiments, the sound blending methods introduce one or more sounds to blend sounds generated by the powertrain 16.

Figure 5:
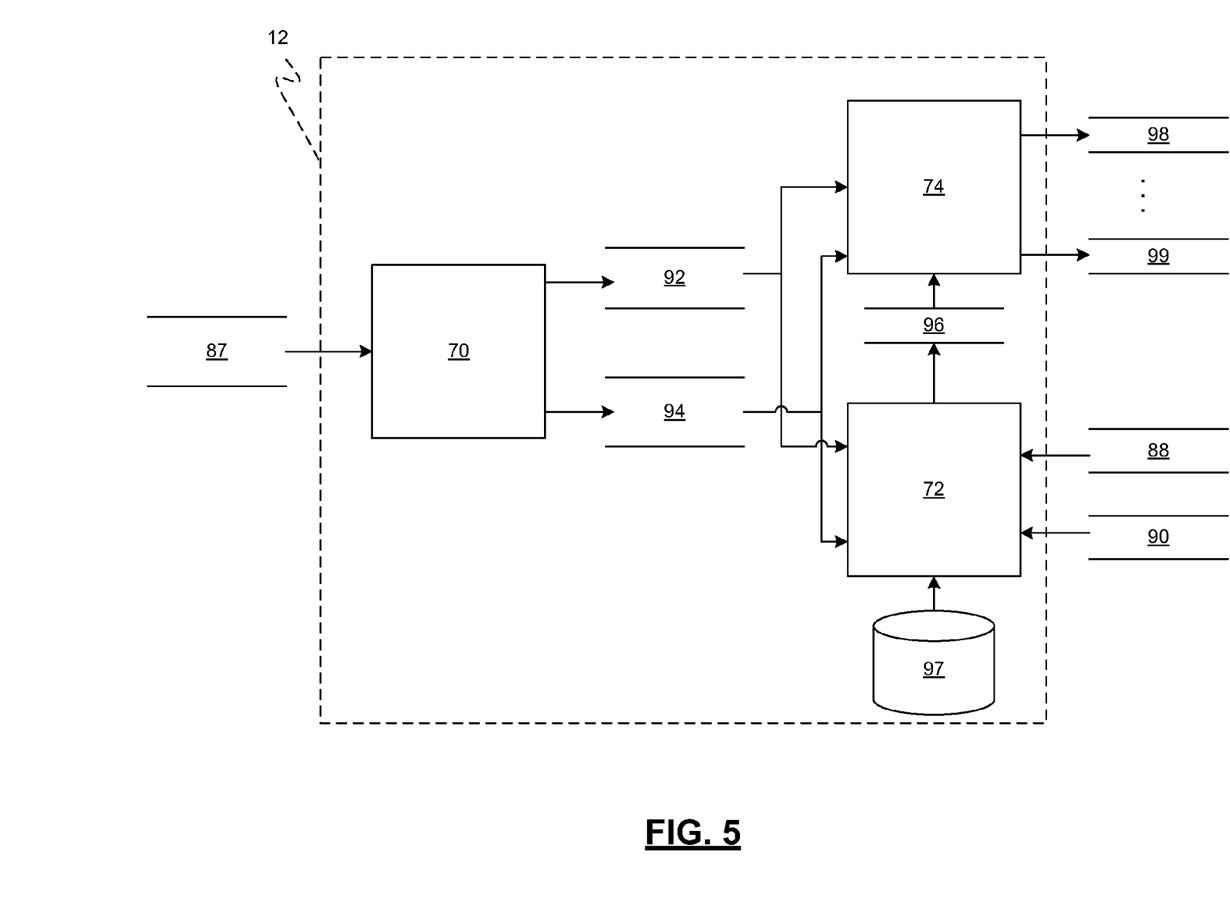
FIG. 5 is a dataflow diagram illustrating an aural smoothing system in accordance with an exemplary embodiment.

Referring now to FIG. 5, a dataflow diagram illustrates various embodiments of the aural smoothing system 12. As can be appreciated, various embodiments of aural smoothing systems 12 according to the present disclosure may include any number of modules. As can be appreciated, the modules shown in FIG. 5 may be combined and/or further partitioned to similarly perform aural smoothing. Inputs to the aural smoothing system 12 may be sensed directly from the vehicle 10 (FIG. 1), received from other modules within the vehicle 10 (FIG. 1), for example, via the vehicle communication network 66 (FIG. 1), and/or determined/modeled by other modules (not shown) of the aural smoothing system 12. In various embodiments, the aural smoothing system 12 includes a transition determination module 70, a tone manager module 72, and a speaker manager module 74.

The transition determination module 70 receives as input powertrain data 87. The powertrain data 87 can be any data associated with the powertrain 16 (FIG. 1) that may be indicative of a powertrain transition event. For example, the powertrain data can include, but is not limited to engine torque, manifold absolute pressure, engine speed, engine activation/deactivation signals, or other signals indicative of transition events.

Based on the powertrain data 76, the transition determination module 70 determines a transition type 92 and/or a transition stage 94. The transition type 92 indicates the type of transition occurring. For example, when the powertrain 16 (FIG. 1) includes the engine system 18 (FIG. 2) that can perform activation and deactivation transitions, the transition type 92 can be a deactivation transition or an activation transition. In another example, when the powertrain 16 (FIG. 1) includes the hybrid system 44 (FIG. 3), the transition type 92 can be, for example, an engine start transition, an engine stop transition, a motor start transition, or a motor stop transition. In yet another example, when the powertrain 16 (FIG. 1) includes an electric system 52 (FIG. 4) with or without an engine 20 (FIG. 4) for extended range, the transition type 92 can be, for example, a motor start transition, a motor stop transition, an engine start transition, or an engine stop transition. The transition determination module 70 determines the transition type 92 by evaluating the powertrain data 87 against predetermined transition data.

The transition stage 94 indicates a stage of the transition occurring. In various embodiments, the transition stage 94 can merely identify the transition and can be for example, transition, or no transition. In various other embodiments, the transition stage 94 can identify stages of the transition and can be, for example, entering the transition, transitioning, exiting the transition, transition complete, or no transition. In various embodiments, the transition determination module 70 determines the transition stage 94 by evaluating the powertrain data 87 against predetermined transition data.

In various other embodiments, the transition determination module 70 determines the transition stage 94 based the transition type 92 and/or powertrain data 87 and a predetermined schedule. For example, when the transition type 92 or powertrain data 87 indicates a particular transition, the transition stage 94 is set to the entering the transition stage for a first x seconds. The transition stage 94 is then set to the transitioning stage for the next x seconds. The transition stage 94 is then set to the exiting the transition stage for the next x seconds. Thereafter, the transition stage 94 is set to transition complete stage. When the transition type 92 or powertrain data 87 no longer indicates a particular transition, the transition stage 94 is then set to the no transition.

The tone manager module 72 receives as input engine torque 88, and engine speed 90, the transition type 92, and/or the transition stage 94. In various embodiments, the engine torque 88 can be sensed by a sensor or modeled using sensed and/or modeled various powertrain data. Such powertrain data can include, for example, but is not limited to, engine speed, air mass per cylinder, spark timing, intake cam phaser position, exhaust cam phaser position, exhaust gas recirculation dilution data, spark state, engine valve state (e.g., cylinder deactivation mode, port deactivation, etc.), ethanol concentration, equivalence ratio, manifold pressure, ambient air pressure, oil temperature, coolant temperature, electrical load information, or other data that may affect the determination of engine torque 88.

Based on the inputs 88-94, the tone manager module 72 identifies one or more tones 96 that can counteract (e.g., by masking, blending or cancellation) the amplitude, frequency, and timing of the sounds emitted by the powertrain 16 (FIG. 1) during that transition type 92 and/or transition stage 94. In some cases, additional tones 96 can be introduced. In some cases, tones 96 can reduce sounds emitted by the powertrain 16 (FIG. 1) through active noise cancellation.

The tone manager module 72 determines an amplitude and a frequency of the tone 96 using the engine torque 88 and the engine speed 90, respectively. For example, tone information including amplitude and frequency can be predetermined and stored in a datastore 97 in a two or three dimensional table format based on the engine torque 88 and the engine speed 90. The tones information can then be accessed in real time using a table lookup function. The tone information may be further manipulated using the various powertrain data such that they mask, blend, and/or cancel the intended sounds emitted by the powertrain 16 (FIG. 1). In another example, the amplitude and frequency of the tones 96 are estimated based on the engine torque 88 and the engine speed 90 and one or more tone estimating equations.

In various embodiments, the tone manager module 72 can determine in-vehicle tones and/or outside the vehicle tones to be used in the aural smoothing. For example, the tone information can be predetermined and stored in the datastore 97 as two or more tables, one for in-vehicle tones and one for outside the vehicle tones. In another example, the in-vehicle tones and the outside the vehicle tones can be estimated based one or more tone estimating equations.

In various embodiments, the tone manager module 72 may selectively determine the tones 96 based on the transition stage 94 and/or the transition type 92. For example, the tone information can be predetermined and stored in the datastore 97 as multiple tables, where each table is associated with a particular transition type 92 and/or transition stage 94. In another example, when the transition stage 94 indicates a particular stage or the transition type 92 indicates a particular transition, the tones 96 can be set to a predetermined amplitude and frequency regardless of the engine torque 88 or engine speed 90.

The speaker manager module 74 receives as input the selected tones 96, and the transition type 92 and/or the transition stage 94. Based on the inputs, 92, 94, 96, the speaker manager module 74 determines when to generate the tones 96 and further determines which speakers 64 (FIG. 1) should project the tones 96. For example, when the transition type 92 indicates that a particular transition is occurring, the speaker manager module 74 determines that it is time to generate the tones 96. In another example, the timing of the tone control can be further based on the transition stage 94. For example, the timing of the tone control can be longer than the time of the actual transition so that the sound transition is longer and hence harder to perceive.

Based on when to generate the tones 96 and the selected speakers 64 (FIG. 1), the speaker manager module 74 generates one or more signals 98, 99. In various embodiments, the signals 98, 99 are communicated to the infotainment module 62 (FIG. 1) so that the infotainment module 62 (FIG. 1) can control the selected speakers 64 (FIG. 1) to project the selected tones 96. In various other embodiments, the signals 98, 99 are communicated directly to the selected speakers 64 (FIG. 1) to project the selected tones 96. For example, by projecting the selected tones 96 through the selected speakers 64 (FIG. 1), the sounds can be blended across the transitions through the introduction of masking sounds or ramping in sounds.

Figure 6:
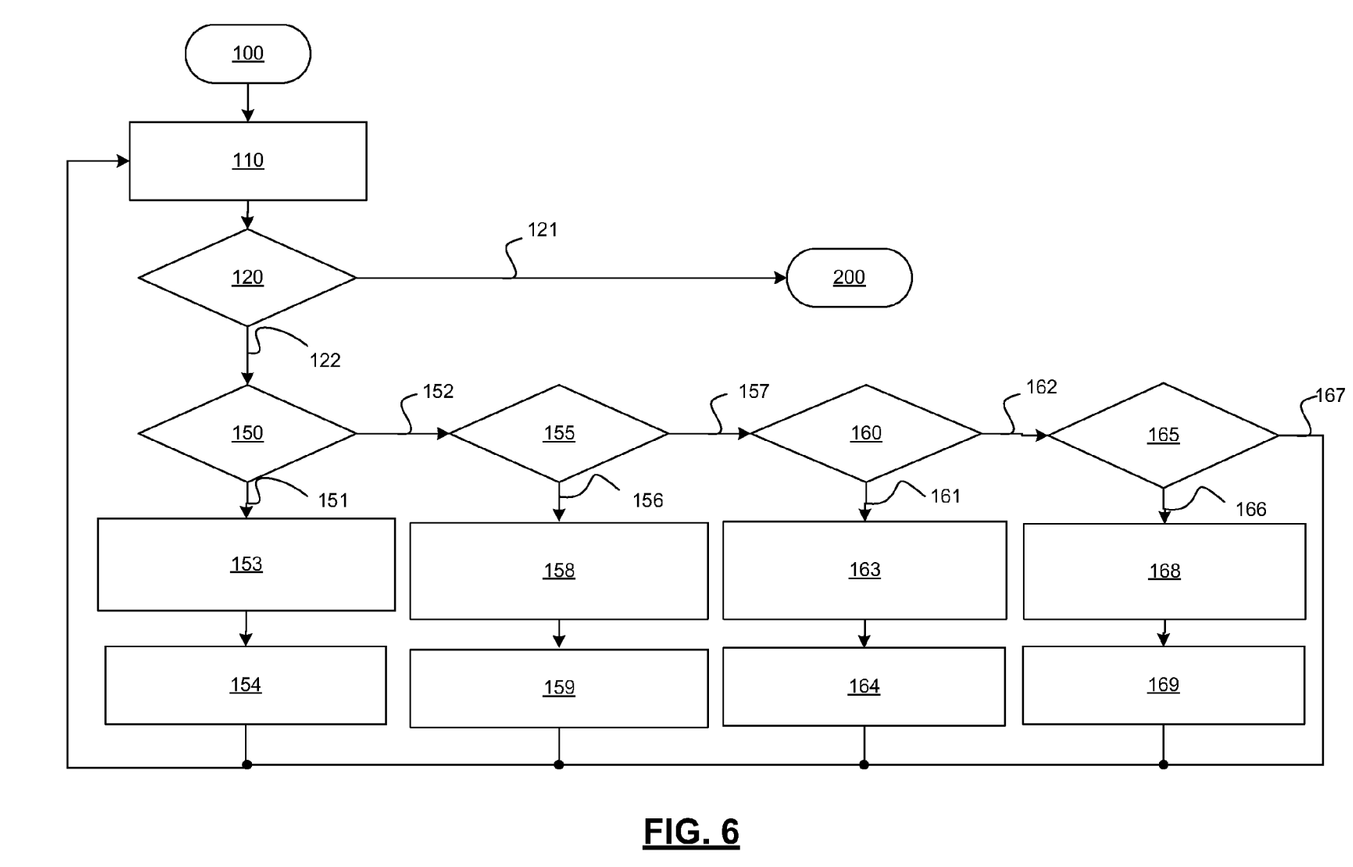
FIG. 6 is a flowchart illustrating an aural smoothing method in accordance with an exemplary embodiment.

Referring now to FIG. 6, and with continued reference to FIG. 5, a flowchart illustrates aural smoothing methods that can be performed by the aural smoothing system 12 of FIG. 5 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. As can further be appreciated, one or more steps may be added or removed without altering the spirit of the method.

In various embodiments, the method can be scheduled to run based on predetermined events, and/or may run continually during operation of the vehicle 10 (FIG. 1) (as shown).

In one example, the method may begin at 100. The transition stage 94 and/or transition type 92 is monitored at 110 and a transition event is determined at 120 and the transition stage is determined at 150, 155, 160, and 165.

If a transition event is occurring at 122, and if the transition stage 94 indicates, for example, entering the transition at 151, the tones 96 are selected based on a predetermined values at 153. For example, tones that provide active noise cancellation and blending can be selected during the entering the transition stage. Further based on the transition type 92 and/or the transition stage 94, one or more speakers 64 (FIG. 1) are selectively controlled to project the selected tones 96 via signals 98, 99 at 154. Thereafter, the method continues with monitoring the transition stage 94 or transition type 92 at 110.

If, however, the transition stage 94 does not indicate entering the transition at 152, rather, it indicates transitioning at 156, the selected tones 96 are adjusted based on the engine torque 88 and the engine speed 90 at 158. Once the tones have been selected, further based on the transition type 92 and/or the transition stage 94, one or more speakers 64 (FIG. 1) are selectively controlled to project the selected tones 96 at 159. Thereafter, the method continues with monitoring the transition stage 94 or transition type 92 at 110.

If, however, the transition stage 94 does not indicate entering the transition at 152, nor transitioning at 157, rather, it indicates exiting the transition at 161, the selected tones 96 are further adjusted based on the engine torque 88 and the engine speed 90 at 163. Once the tones have been selected, further based on the transition type 92 and/or the transition stage 94, one or more speakers 64 (FIG. 1) are selectively controlled to project the selected tones 96 at 164. Thereafter, the method continues with monitoring the transition stage 94 or transition type 92 at 110.

If, however, the transition stage 94 does not indicate entering the transition at 152, or transitioning at 157, or exiting the transition at 162, rather it indicates transition complete at 166, the tones 96 are selected based on predetermined values at 168. Once the tones 96 have been selected, further based on the transition type 92 and/or the transition stage 94, one or more speakers 64 (FIG. 1) are selectively controlled to project the selected tones 96 at 169.

The method of selecting the tones and controlling the speakers continues at 167 until there is no transition event at 121. Thereafter, the method may end at 200.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of controlling sounds associated with a vehicle having a powertrain that includes an engine, the method comprising:
performing on a processor,
monitoring engine torque of the engine;
receiving, as input, powertrain data associated with the powertrain, the data being indicative of a powertrain transition event;
based on the powertrain data, determining a transition type and a transition stage associated with the powertrain transition event, said determining comprising evaluating the powertrain data against predetermined transition data, wherein transition stages include entering transition, transitioning, exiting transition, and transition complete;
selectively generating one or more predetermined tones associated with the vehicle based on the engine torque, the transition type, and the transition stage; and
selecting, based on the transition type and the transition stage, which speakers of a plurality of speakers in the vehicle to project the predetermined tones;
wherein the transition type is indicative of a type of transition occurring, and the transition stage being indicative of a stage of a transition occurring;
wherein the transition type includes at least one of an activation event of one or more engine cylinders, a deactivation event of one or more engine cylinders, a start event of an engine and a stop event of the engine;
wherein the transition stage is based on a predetermined schedule of entering the transition and exiting the transition;
wherein the one or more predetermined tones are configured and timed so as to remove or blend objectionable sounds emitted by the powertrain;
said selectively generating one or more predetermined tones comprises accessing predetermined tone information from a datastore based on the engine torque, the transition type, and the transition stage, said predetermined tone information characterized according to amplitude, frequency, and timing; and
wherein selectively generating one or more predetermined tones includes generating one or more tones having an entering transition component, a transitioning component, an exiting transition component, and a transition complete component, each component being emitted for a predetermined time period.

2. The method of claim 1 wherein the one or more predetermined tones are configured and timed so as to remove objectionable sounds emitted by the powertrain.

3. The method of claim 1 wherein the one or more predetermined tones are configured and timed so as to blend objectionable sounds emitted by the powertrain.

4. The method of claim 1 wherein the selectively controlling the generation of one or more tones comprises:
determining an amplitude of the one or more tones based on the engine torque; and
selectively controlling the generation of the amplitude of the one or more tones.

5. The method of claim 4 wherein the selectively controlling the generation of one or more tones further comprises:
determining a frequency of the one or more tones based on engine speed; and
selectively controlling the generation of the frequency of the one or more tones.

6. The method of claim 1 wherein the transition stage includes at least one going through the transition and completing the transition.

7. An aural smoothing system for a vehicle having a powertrain that includes an engine, the system comprising:
a tone manager module configured for:
monitoring engine torque;
receiving, as input, powertrain data associated with the powertrain, the data being indicative of a powertrain transition event;
based on the powertrain data, determining a transition type and a transition stage associated with the powertrain transition event, said determining comprising evaluating the powertrain data against predetermined transition data, wherein transition stages include entering transition, transitioning, exiting transition, and transition complete;
selectively generating one or more predetermined tones associated with the vehicle based on the engine torque, the transition type, and the transition stage; and
selecting, based on the transition type and the transition stage, which speakers of a plurality of speakers in the vehicle to project the predetermined tones;
wherein the transition type is indicative of a type of transition occurring, and the transition stage is indicative of a stage of a transition occurring;
wherein the transition type includes at least one of an activation event of one or more engine cylinders, a deactivation event of one or more engine cylinders, a start event of an engine and a stop event of the engine; and
wherein the transition stage is based on a predetermined schedule of entering the transition and exiting the transition; and
a speaker manager module configured to generate speaker signals based on the one or more predetermined tones, the one or more predetermined tones being configured and timed so as to remove or blend objectionable sounds emitted by a drivetrain of the vehicle;
wherein said selectively generating the one or more predetermined tones comprises accessing predetermined tone information from a datastore based on the engine torque, the transition type, and the transition stage, said predetermined tone information characterized according to amplitude, frequency, and timing; and
wherein selectively generating one or more predetermined tones includes generating one or more tones having an entering transition component, a transitioning component, an exiting transition component, and a transition complete component, each component being emitted for a predetermined time period.

8. The system of claim 7 wherein the transition stage includes at least one going through the transition and completing the transition.

9. A vehicle having a powertrain that includes an engine, the vehicle comprising:
a control module that selectively controls one or more components of the engine and that generates an engine torque signal; and
an aural smoothing system configured for:
monitoring the engine torque signal;
receiving, as input, powertrain data associated with the powertrain, the data being indicative of a powertrain transition event;
based on the powertrain data, determining a transition type and a transition stage associated with the powertrain transition event, said determining comprising evaluating the powertrain data against predetermined transition data, wherein transition stages include entering transition, transitioning, exiting transition, and transition complete;

selectively generating one or more predetermined tones associated with the vehicle based on the engine torque, the transition type, and the transition stage; and selecting, based on the transition type and the transition stage, which speakers of a plurality of speakers in the vehicle to project the predetermined tones;

wherein the transition type is indicative of a type of transition occurring, and the transition stage is indicative of a stage of a transition occurring;

wherein the transition type includes at least one of an activation event of one or more engine cylinders, a deactivation event of one or more engine cylinders, a start event of an engine and a stop event of the engine and wherein the transition stage is based on a predetermined schedule of entering the transition and exiting the transition;

the one or more predetermined tones being configured and timed so as to remove or blend objectionable sounds emitted by a drivetrain of the vehicle;

wherein said selectively generating the one or more predetermined tones comprises accessing predetermined tone information from a datastore based on the engine torque, the transition type, and the transition stage, said predetermined tone information characterized according to amplitude, frequency, and timing; and wherein selectively generating one or more predetermined tones includes generating one or more tones having an entering transition component, a transitioning component, an exiting transition component, and a transition complete component, each component being emitted for a predetermined time period.

10. The vehicle of claim 9 wherein the aural smoothing system selectively controls the generation of the one or more tones by communicating with an infotainment system.

11. The vehicle of claim 9 wherein the aural smoothing system further monitors a transition event signal and selectively determines the one or more tones based on the transition event signal.

12. The method of claim 9, wherein the amplitude and frequency information is manipulated so as to cancel sounds emitted by a powertrain of the vehicle.

13. The method of claim 1, wherein at least one of the speakers resides outside of the vehicle, the tones include in-vehicle tones and outside vehicle tones, and the outside vehicle tones are projected through a speaker residing outside of the vehicle.

* * * * *